UNITED STATES PATENT OFFICE 2,598,693

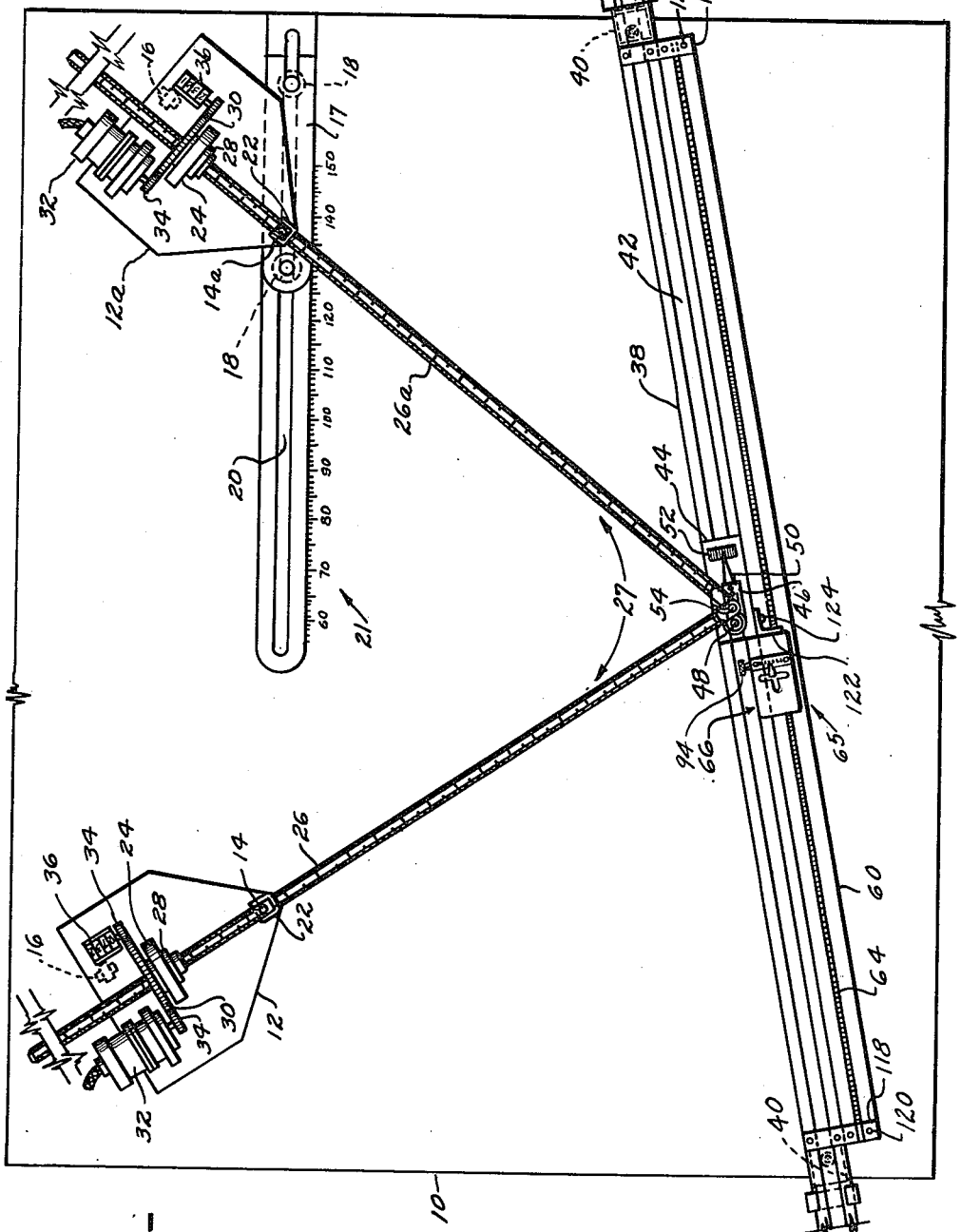

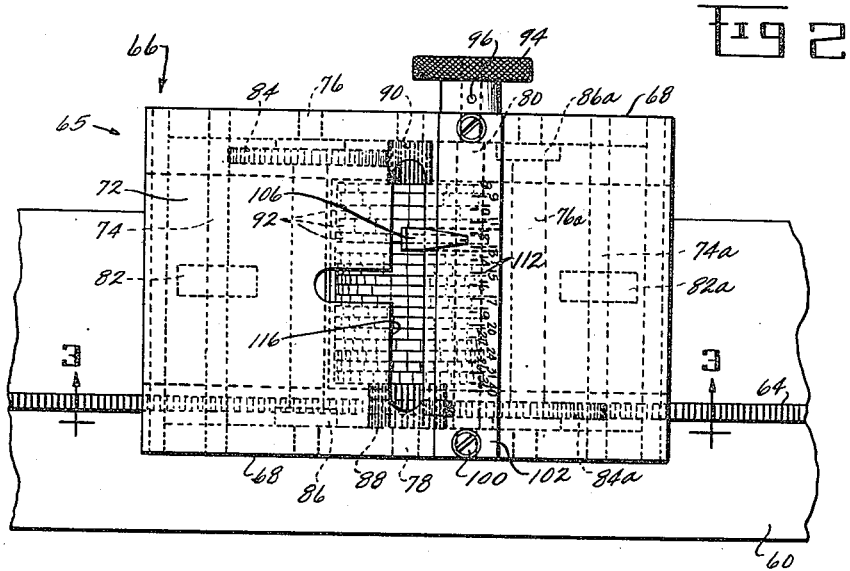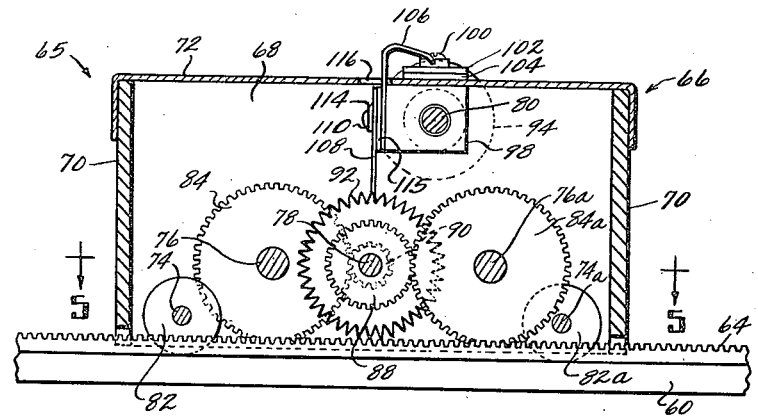

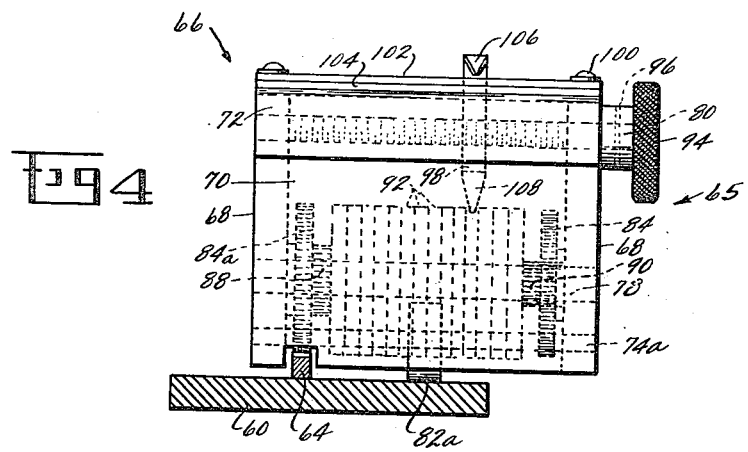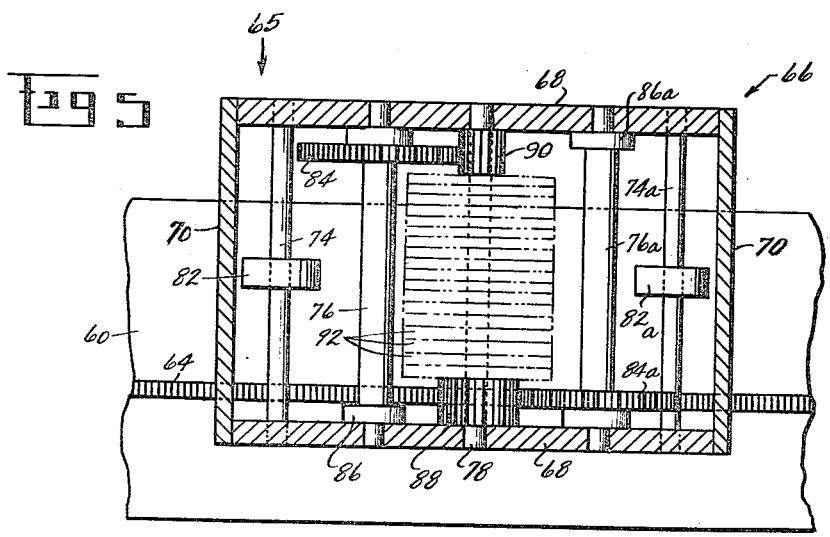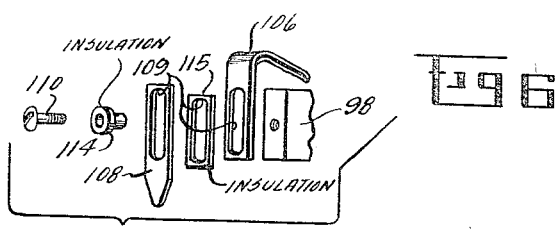

SHORAN INTERVALOMETER

James E. Henry, Dayton, Ohio

Application December 8, 1950, Serial No. 199,900

4 Claims. (Cl. 200—52)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to improvements in straight line computers and more particularly to a device to be used in conjunction with the shoran straight line indicator in photomapping large rectangular areas.

The shoran straight line indicator is presently being used in photographing large rectangular areas of terrain from an aircraft, wherein the aircraft starts at one corner of the area, flies straight for the length of the area, turns and flies straight and parallel to the first pass or strip back to the edge of the terrain from which it started and repeats this cycle back and forth taking shots at such time intervals as will provide slight overlap between one shot and the next until the desired area is covered.

In the above procedure it is further required that the craft maintain its altitude constant; and that the several strips or passes all be flown in a straight line; that the strips be parallel to each other; and that the strips overlap each other a predetermined distance. These several requirements are all met in the device illustrated and described in the accompanying drawing and specification, wherein:

Fig. 1 is a plan view of a shoran straight line indicator, being that portion of the shoran mapping system which is carried on the aircraft.

Fig. 2 is a plan view of the intervalometer which cooperates with the indicator of Fig. 1 in carrying out the objects of the present invention.

Fig. 3 is a vertical section taken at 3—3 of Fig. 2, showing the gearing and the contact mechanism.

Fig. 4 is an end view of the intervalometer.

Fig. 5 is a horizontal section taken on the line 5—5 of Fig. 3 showing the rollers, gearing and the switch contact wheels.

Fig. 6 is an exploded view of the adjustable contact indicator and the contact.

Inasmuch as the present invention is to be used in combination with the shoran straight line indicator, the following brief description of the construction and operation of such portion of the straight line indicator as cooperates with the present invention may be of assistance in understanding the invention.

Two ground radio stations are selected preferably from fifty to one hundred twenty-five miles apart and preferably about the same distance from the area which is to be photographed. If no suitably spaced stations are available then two relatively low power stations may be temporarily set up. A third station is carried on an aircraft which is at the area which is to be mapped. One of the ground stations is termed the rate station and the other the drift station.

The airborne station transmits series of rate pulses and series of drift pulses at different frequencies during alternate intervals of about $\frac{1}{10}$ second. Each rate pulse triggers the ground station tuned to the rate frequency, which transmits a pulse back to the airborne station. Similarly the drift station is triggered by each drift pulse and transmits a pulse to the equipment in the airplane.

The time required for the rate and drift pulses to travel to the corresponding ground stations and back to the airplane is indicative of the distance between the airplane and the two ground stations. These distances are referred to as the shoran distances, and the airborne equipment is so graduated that the shoran distances may be read directly in miles.

Considering the distance between the two ground stations as the base of a triangle wherein the sides adjacent are the shoran distances and the apex is the converging point of the shoran distances on the aircraft, a facsimile of the triangle in miniature, made to a scale of one one-millionth to one is provided and carried on the aircraft. This facsimile is the basic structural portion of the straight line computer and comprises a base 10 and carriages 12 and 12a, the carriages being supported at the forward ends on pivoting members 14 and 14a and at the rearward ends on rollers 16. The pivoting members 14 and 14a are fixed at the upper ends in the carriages 12 and 12a and rotatable in the base 10 and in an adjusting block 16 respectively, and are spaced apart from each other a distance which represents, to a scale of one one-millionth to one, the distance between the rate station and the drift station.

Where existing stations have been selected as rate and drift stations for mapping an area, the distance between pivoting members 14 and 14a may be set in accordance with the distance between the two selected stations by loosening the nuts 18 and sliding the block 17, which carries the pivoting member 14a, endwise in the channel 20 to that graduation 21 which represents the desired distance, and the nuts then retightened.

Rod supporting members 22 and 24 extend upwardly from the upper surface of each carriage and are provided with transverse openings through which externally threaded rods 26 and 26a are endwise slidable. The hubs 28 of gears 30 are internally threaded to receive the externally threaded rods 26 and 26a and externally machined to provide rotative bearing for the gears 30 in the rod supporting members 22 and 24. Rods 26 and 26a are flattened to provide a place for the graduation 27 which represents miles distance. Self-synchronizing motors 32 are mounted, one on each carriage, the motors being provided with pinions 34 in constant mesh with the gears 30. Additional pinions 34, also in constant mesh with gears 30 are provided for rotating the counters 36.

A rail 38 is secured to the base 10 at its ends by clamps 40. Rail 38 has a guide groove 42 throughout its length in which a runner 44 is slidable. A swinging arm 46 is pivoted on the runner 44 at 48, while the other end of the arm 46 carries the contact member 50 of a potentiometer 52.

The forward ends of the rods 26 and 26a are flattened and converge in a pivot pin 54 which is fast in the flattened end of one rod and rotatable in the flattened end of the other. The distances between the pivoting pin 54 and the pivoting members 14 and 14a are representative, to a scale of one one-millionth to one, of the distances from the aircraft to the rate station and the drift station respectively.

The pivoting pin 54 extends downwardly and has rocking bearing in the swinging arm 46 at a point intermediate the pivot 48 and the contact member 50. The operation of the straight line indicator is essentially as follows:

Two radio stations which are preferably spaced apart one hundred twenty-five miles more or less may be selected for a rate station and a drift station in the mapping operation. If no suitably spaced stations are within range of the objective, temporary stations may be erected. In either event the nuts 18, Fig. 1, are loosened and the block 16 adjusted until the spacing between pivots 14 and 14a is in accordance with the spacing between the rate station and the drift station as shown on the graduation 21.

The self synchronizing motors 32 may now be rotated to shorten or lengthen the effective length of the rods 26 and/or 26a until the distance between pivots 14 and 54 and the distance between pivots 14a and 54 correspond to the distance between the rate station and the airborne station and between the drift station and the airborne station. The distances from the airborne station and the rate station and the distance between the airborne station and the drift station may be taken by radar and noted on the graduations 27.

The rail 38 is now clamped at its ends to the base 10, the angle of the rail with respect to the base being preferably in alignment with the longer edge of the rectangular area which is to be mapped.

If the aircraft is now flown in any direction away from the position represented by the pivot 54, the distance between the airborne station and the rate station, and the distance between the airborne station and the drift station, will be altered, and the electrical system is such that the self-synchronizing motors 32 revolve in response to the altered distances as measured by radar and will reset the distance between the point 54 and the point 14 and the distance between the point 54 and the point 14a on the airborne equipment, Fig. 1.

If the aircraft flies in a straight line along the rail 38, the contact member 50 will remain centrally positioned as shown, but if the line of flight deviates from the straight course, the contact member 50 will move to the right or left and operate the potentiometer 52, the extent of the current being recorded on an indicator so that the pilot could correct his course, or the current may be passed to the autopilot whereby correction of the course will be automatically made.

The straight line indicator upon which the present improvement is used is more elaborately described and shown in my copending application Serial No. 722,277, filed January 15, 1947, now Patent No. 2,591,698, dated April 8, 1952.

The intervalometer 65, which is used in combination with the straight line indicator for mapping large rectangular areas, is shown in Figs. 2 through 6 and comprises an intervalometer rail 60 which is laid alongside the straight line indicator rail 38 and secured thereto by plates 118 held by screws 120. A toothed rack 64 is fast on the rail 60 and extends from one end to the other thereof.

A box-like casing 66 is made up of two side plates 68, and two end plates 70 and a cover 72. The side plates 68 provide bearings for shafts 74, 74a, 76, 76a, 78 and 80.

Spaced midway of their length on shafts 74 and 74a are smooth rollers 82 and 82a, the rollers being movable along on the smooth surface of the rail 60.

Alongside the bearing at the rearward end of the shaft 76 and at the forward end of the shaft 76a are relatively large toothed gears 84 and 84a respectively, while alongside the bearings at the opposite ends of the shafts 76 and 76a are collars 86 and 86a for restraining endwise movement of the shafts 76 and 76a.

Gear 84a is shown in toothed engagement with the rack 64, while gear 84 is so positioned on the shaft 76 that if the device is lifted off the rack and turned 180 degrees on a vertical axis and returned, the gear 84 will be in toothed engagement with the rack 64.

Fast on the shaft 78 at the forward end is a pinion 88 and at the rearward end a smaller pinion 90 about half the diameter of the pinion 88. Pinion 88 is in constant mesh with large gear 84a, while smaller pinion 90 is in constant mesh with large gear 84, whereby when the device is lifted and turned end for end, the number of turns of shaft 78, per unit of travel of the device along the rack 64, is doubled.

Fast on the shaft 78 intermediate the pinions 88 and 90 are a series of grounded contact wheels 92, the first of the series having five contact teeth spaced around its circumference and the remainder each having one more than the one next previous.

The shaft 80 is externally threaded throughout its length except at the ends where it is reduced in diameter at the forward end for a bearing and at the rearward end for a bearing and for the knob 94 which is secured to the shaft by a pin 96. A contact carrier 98 is internally threaded to fit the external threads on the shaft 80 whereby rotation of the shaft moves the carrier backward or forward.

Mounted on the cover 72 and secured thereto at the ends by screws 100 is an indicator plate 102. A strip of insulation 104 insulates the plate 102 from the cover. The plate 102 is graduated in thousands of feet altitude from eight thousand to forty thousand.

Mounted on the left end of the contact carrier 98 is a contact indicator 106 and a contact 108. The contact indicator 106 and the contact 108 each have an elongated slot 109 through which a screw 110 extends into the contact carrier 98, whereby, by loosening the screw 110, either member may be adjusted vertically, the contact indicator 106 being made adjustable to bring the indicator close up to the graduation 112 of the indicator plate 102 and the contact 108 being made adjustable to bring the teeth of the discs 92 into contact with the contact 108. A strip of insulation 115 separates the contact indicator 106 from the contact 108. A shoulder bushing 114 of insulation separates the grounded screw 110 from the contact 108 and indicator 106. A slot 116 in the cover 72 permits the indicator 106 to extend upwardly through the slot and to the graduation 112.

In operation the track 60 of the intervalometer is attached alongside the track 38 of the straight line indicator by means of track connector strips 118 which are attached by means of screws 120. The intervalometer is operated by moving it along the rack 64 of the intervalometer track 60. A bracket 122 is fastened by screws 124 both to the runner 44 of the straight line indicator and to the casing 66 of the intervalometer 65, whereby, when the runner 44 is moved along the track 38, by increasing or decreasing the effective length of the rods 26 or 26a, the intervalometer 65 will move in unison with the runner 44. If the mapping aircraft which carries the equipment, Fig. 1, veers right or left off its true course which is the center line of the rail 38, the contact member 50 of the potentiometer 52 will point right or left and direct a current in one or the other direction through an appropriate signal for the pilot to observe or through the autopilot if one is used to bring the craft back into line with the selected course.

Having described one embodiment of my invention, I claim:

1. An intervalometer attachment for a shoran straight line indicator which comprises, in combination, an intervalometer track for said attachment, means for parallelly securing said track to the track of said indicator, an intervalometer movable longitudinally on said intervalometer track, a casing for said intervalometer, side plates and a lid for said casing, roller shafts having rotative bearing in said side plates, rollers on said roller shafts for supporting said intervalometer as it is moved along said track, gear shafts having rotative bearing in said side plates, a rack extending longitudinally on said intervalometer track inside the casing alongside one of said side plates, gears within said casing on said gear shafts, one said gear being adjacent to the one said side plate and in mesh with said rack, the other said gear being adjacent to the other said side plate and out of mesh with said rack, a contact wheel shaft, a large pinion on one end of the contact wheel shaft in mesh with the said one gear, a small pinion on the other end of the contact wheel shaft in mesh with the said other gear, a series of toothed contact wheels fast on the contact wheel shaft between said pinions, an externally threaded contact carrier shaft having rotative bearing in said side plates, an internally threaded contact carrier on said externally threaded shaft, a knob on said externally threaded shaft for rotating said externally threaded shaft to move said carrier axially thereon, a graduated indicator plate on the casing lid above said externally threaded shaft having indicia representing altitude in thousands of feet, means to electrically insulate said indicator plate from said casing, a vertically adjustable indicator adjustably and insulatedly secured to said carrier and a vertically adjustable contact member adjustably and insulatedly secured to said carrier and positioned to make contact upon rotation of said contact wheels with the teeth of one of said contact wheels.

2. An intervalometer attachment for a shoran straight line indicator which comprises, in combination, an intervalometer track for said attachment, means for parallelly securing said track to the track of said indicator, an intervalometer movable longitudinally on said intervalometer track, a casing for said intervalometer, side plates and a lid for said casing, rollers for supporting said intervalometer as it is moved along said track, a rack extending longitudinally on said intervalometer track inside the casing alongside one of said side plates, gears within said casing, one said gear being adjacent the one side plate and in mesh with said rack, the other said gear being adjacent the other side plate and out of mesh with said rack, a contact wheel shaft, a large pinion on one end of the contact wheel shaft in mesh with the said one gear, a small pinion on the other end of the contact wheel shaft in mesh with the said other gear, a series of toothed contact wheels fast on the contact wheel shaft between said pinions, an externally threaded contact carrier shaft having rotative bearing in said side plates, an internally threaded contact carrier on said externally threaded shaft, a knob on said externally threaded shaft for rotating said externally threaded shaft to move said carrier axially thereon, a graduated indicator plate on the casing lid above said externally threaded shaft, means to electrically insulate said indicator plate from said casing, a vertically adjustable indicator adjustably and insulatedly secured to said carrier and a vertically adjustable contact adjustably and insulatedly secured to said carrier and positioned to make contact upon rotation of said contact wheels with the teeth of one of said contact wheels.

3. A combined intervalometer and shoran straight line indicator which comprises a track, an intervalometer movable longitudinally on said track, a casing for said intervalometer, rollers for supporting said intervalometer as it is moved along said track, a rack extending longitudinally on said track inside the casing along side one side thereof, gears within said casing, one gear being adjacent one side of said casing wall and in mesh with said rack, the other said gear being adjacent the other side of said casing and out of mesh with said rack, a contact wheel shaft, a large pinion on one end of the contact wheel shaft in mesh with the said one gear, a small pinion on the other end of the contact wheel shaft in mesh with the said other gear, a series of contact wheels fast on the contact wheel shaft between said pinions, an externally threaded contact carrier shaft having rotative bearing in said casing, an internally threaded contact carrier on said externally threaded shaft, a knob on said externally threaded shaft for rotating said externally threaded shaft to move said carrier axially thereon, a graduated indicator plate on the casing lid above said externally threaded shaft, means to electrically insulate said indicator plate from said casing, an indicator adjustably and insulatedly secured to said carrier and a contact adjustably and insulatedly secured to said carrier and positioned to make contact upon rotation of said contact wheels with the teeth of one of said contact wheels.

4. An intervalometer comprising a casing, a contact-wheel shaft extending transversely of the casing, a first and a second pinion fast on opposite ends of said contact-wheel shaft, a series of contact wheels of different numbers of teeth fast on said contact wheel shaft and filling the space on the contact-wheel shaft between said pinions, said first pinion being substantially double the diameter of the second pinion, a first and a second gear in mesh with said first and second pinion respectively, the axis of the contact-wheel shaft and the axes of the first and second gears being substantially in the same plane, a rack extending longitudinally through said casing in mesh with said first gear, whereby, when said casing is turned one hundred eighty degrees on a vertical axis, the rack will be in mesh with said second gear and the rotative speed of the contact-wheel shaft will be doubled, a contact carrier shaft, a contact carrier movable axially on said contact-carrier shaft, a graduated indicator plate on the casing, an indicator secured to said carrier and pointing to the graduations on said plate and a contact insulatedly secured to said carrier, and positioned to make contact with successive teeth of one of said contact wheels upon rotation of said contact wheels, and upon successive wheels upon movement of said contact carrier axially.

JAMES E. HENRY.

REFERENCES CITED

The following references are of record in the file of this patent:

UNITED STATES PATENTS

| Number | Name | Date |
|---|---|---|
| 936,835 | Van Horn | Oct. 12, 1909 |